(12) United States Patent
Bello

(10) Patent No.: US 6,220,515 B1
(45) Date of Patent: Apr. 24, 2001

(54) IDENTIFICATION SYSTEM AND METHOD

(76) Inventor: Ralph R. Bello, 35 Andrew La., Orange, CT (US) 06477

( * ) Notice: Subject to any disclaimer, the term of this patent is extended or adjusted under 35 U.S.C. 154(b) by 0 days.

(21) Appl. No.: 09/460,958

(22) Filed: Dec. 14, 1999

Related U.S. Application Data

(63) Continuation-in-part of application No. 09/008,091, filed on Jan. 16, 1998.

(51) Int. Cl.$^7$ .................................................. G06K 19/00
(52) U.S. Cl. .......................................... 235/487; 235/454
(58) Field of Search .................................... 235/454, 487

(56) References Cited

U.S. PATENT DOCUMENTS

| | | |
|---|---|---|
| 4,636,622 | 1/1987 | Clark . |
| 4,687,526 | 8/1987 | Wilfert . |
| 4,754,487 | 6/1988 | Newmuis . |
| 4,904,853 | 2/1990 | Yokokawa . |
| 4,972,476 | 11/1990 | Nathans . |
| 5,235,680 * | 8/1993 | Bijnagte ............................... 395/162 |

FOREIGN PATENT DOCUMENTS 2173970   10/1986   (GB) .

* cited by examiner

*Primary Examiner*—Harold I. Pitts
(74) *Attorney, Agent, or Firm*—Robert H. Montgomery

(57) ABSTRACT

An identification method is disclosed which comprises establishing a database or using an existing database of authorized credit card holders which is addressed by credit card identification number or other identifying nomenclature to determine the validity of a credit card account and the status thereof when the card is presented for a transaction at a transaction point. The database will contain in digital form an identification (ID) photo of the authorized credit card holder, a digital representation of the signature of the authorized card holder and other personal and physical data as well as the condition of the account i.e. transaction authorized or declined. The attendant at the transaction point will insert the credit card into a card reader together with identification of the transaction (price and/or other data) and transmit this information to the database. The ID photo and selected other data will be transmitted back to the point of transaction and viewed by the attendant on a video monitor. The attendant will then make a comparison of the card presenter with the ID photo and continue with the transaction if positive comparison is made. If the attendant is not sure of visual identification the attendant may then question the presenter regarding the personal data in order to insure positive identification of the presenter.

3 Claims, 2 Drawing Sheets

IDENTIFICATION SYSTEM AND METHOD

RELATED APPLICATIONS

This application is a continuation-in-part of application Ser. No. 09/008,091, filed Jan. 1, 1998.

FIELD OF THE INVENTION

This invention relates to identification of holders and users of credit cards and more particularly relates to the storage of and read out or down load from storage of identifying information including a photo image of an authorized credit card holder.

BACKGROUND OF THE INVENTION

The use or misuse of stolen or counterfeit credit cards is an ever- present problem. Widely used credit cards have some data encrypted on the back, which identifies the account number of an authorized holder. Such information commonly includes four sets of four digits which is machine read at a transaction point for verification that it is a valid number, the account is open and there is a sufficient balance in the account to cover the transaction. The term "balance" refers to the difference in the credit limit on the account and the sum then owing. As used herein the term "transaction" refers to an exchange having a monetary value, such as a purchase of goods or services, or making a cash withdrawal from a bank against a credit card. In a typical transaction, a purchaser selects an item and offers payment by credit card. The sales attendant will enter the price of an item(s) and a name or code identifying the item(s). This is commonly done by an optical reader reading a bar code on the item(s) or container therefore. This information together with the account number, read from the credit card, is transmitted to a remote database which contains data representative of accounts of millions of cardholders at addresses identified by the card number. The transmitted number from the presented credit card addresses the account of the authorized cardholder. A computation is electronically made to determine that there is a sufficient balance in the account to cover the purchase and a check to determine if the account is still open for further transactions. If these checks are positive, a signal is transmitted back to the transaction point to indicate that the charge is accepted. If either of these checks are negative a signal is sent to the point of transaction declining the transaction. This information is made visual to the attendant on a video monitor However, this does not enable the attendant at the point of transaction to verify that the person presenting the credit card is the authorized cardholder.

As used herein "transaction point" or "point of transaction" refers to the site where a card is presented to make a purchase or any other type of transaction, which requires presentation of a credit card. "Attendant" refers to the person who receives the credit card who may be a salesperson, a bank teller or any other person having responsibility and authority to act upon receipt of a presented card.

More secure systems have been proposed. U. S. Pat. No. 4,636,632 discloses an identification system where the finger prints of a card presenter are scanned and compared with finger prints on file at a central data base. After comparison, use of the card is authorized or declined. This type of system requires that a scanner be present at the point of a transaction and requires time for the fingers to be accurately positioned for scanning. It is easy to make an initial inaccurate or incomplete scan which results in taking time for another scan or a refusal to accept the card.

It has also been proposed to digitally encode a photograph of the authorized cardholder on a credit card and display this image on a monitor at a point of transaction. Since it is not difficult to read encoded data on a credit card an unauthorized person can obtain a likeness of the encoded photo and in some cases disguise himself as the authorized cardholder. Such systems are disclosed in U. S. Pat. Nos. 4,754,487 and 4,972,476.

Thus far, none of the systems requiring comparison of a characteristic of a credit card presenter with a stored characteristic or digitally encoding a photograph of an authorized credit card holder are known to be in commercial use.

The present invention provides a new and improved system for identifying an authorized credit card holder which does not require any action on the part or a credit card presenter to match a characteristic of the presenter with a stored characteristic and which does not require the digital encoding of a characteristic such as a photo of the authorized card holder on the card. The present invention permits the attendant at a point of transaction to view, not only a photo of the authorized card holder, but other personal data in the event the photograph is not conclusive of identification. The invention may be utilized in conjunction with existing credit cards as well as incorporated in newly issued credit cards.

An object of this invention is to provide a new and improved method of identification of an authorized credit card holder which requires no action on the part of the card presenter and which will provide an attendant at a point of transaction with a photograph of the authorized card holder as well as other personal data of the authorized card holder.

Another object of this invention is to provide such a new and improved method of identification, which may be used with existing credit cards with no change to the card.

A further object of this invention is to provide a new and improved method of identifying an authorized credit card presenter by providing the attendant at a point of transaction with personal data if a photograph downloaded from a database is not conclusive.

SUMMARY OF THE INVENTION

Briefly stated, the invention in one form thereof comprises establishing a database or using an existing database of authorized credit card holders which is addressed by credit card identification number or other identifying nomenclature to determine the validity of a credit card account and the status thereof. The database will contain in digital form an identification (ID) photo of the authorized credit card holder and other personal data as well as the condition of the account i.e. transaction authorized or declined. The attendant at the transaction point will insert the credit card into a card reader together with identification of the transaction (price and/or other data) and transmit this information to the database. The ID photo and selected other data will be transmitted back to the point of transaction and viewed by the attendant on a video monitor. The attendant will then make a comparison of the card presenter with the ID photo and continue with the transaction if positive comparison is made. If the attendant is not sure of visual identification the attendant may then question the presenter regarding the personal data in order to insure positive identification of the presenter.

The invention is particularly pointed out and distinctly claimed in the concluding portion of this specification. The invention, however, together with further objects and advantages thereof may be best appreciated by reference to the following detailed description taken in conjunction with the drawings.

DETAILED DESCRIPTION OF PREFERRED EMBODIMENTS OF THE INVENTION

Figure 1:
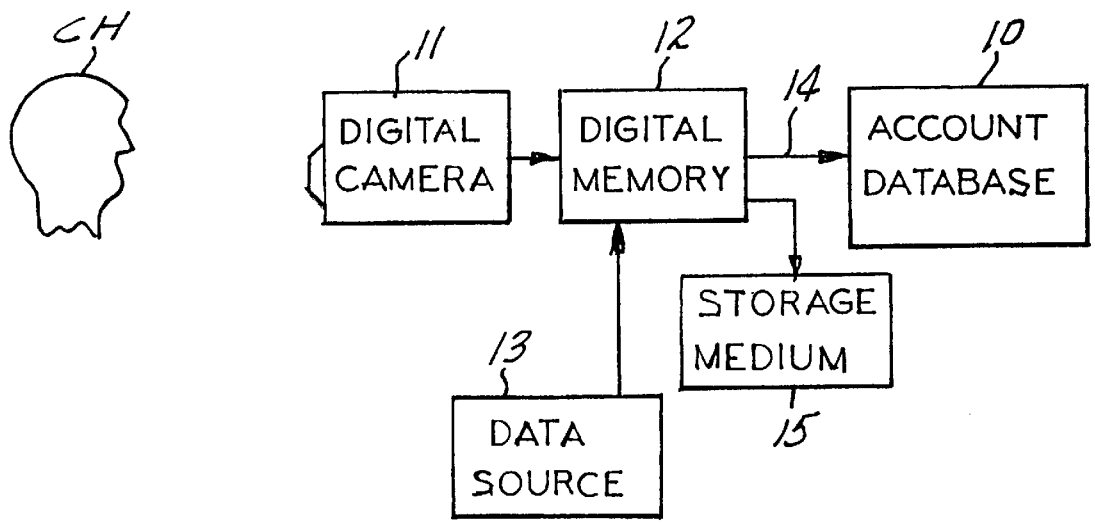
FIG. 1 is a schematic block diagram of apparatus used for practice of the invention.

FIG. 1 exemplifies equipment utilized to enable practice of the invention. An issuer of credit will have access or maintain a database 10 of addressable accounts of its credit card holders. The address is usually the number shown on the credit card. Each address in the database will include data regarding the credit card holder and status of the account (open, closed, credit limit, etc.). Each account in database 10 will include an identification (ID) photo of the authorized cardholder for that account as hereinafter described.

The ID photo of a cardholder CH in the database may be acquired by a digital camera 11 and transmitted to a digital memory 12. Memory 12 may be the memory of a small computer. Memory 12 will also receive from a data source 13 an identification number and personal data regarding the cardholder CH if such data is not already in database 10. The photograph and identification number stored in memory 11 may be transmitted to database 10 either electronically via a transmission line 14. Alternatively a number of accounts and photos may be recorded on a medium such as a floppy disc and then forwarded to the location of the database to be entered at such location.

The issuer of the credit card may establish facilities for acquiring a photograph of an authorized card holder or may retain authorized photo shops to acquire the photographs from properly identified card holders and card holders to be.

The data source 13 may take the form of a keyboard input and a scanner for the signature. Alternatively, all data regarding the cardholder may be prepared on a document which includes the signature and the document then scanned into memory 12. Various data regarding the card holder may be recorded, such as Name Address Date of Birth Social Security No.

Height

Weight

Hair Color

Eye Color

Mother's Maiden Name

Copy of Signature

The foregoing data or characteristics is not intended to be exhaustive, or need each item be included. Moreover, not all data need be displayed at the initial addressing of a card account in the database. For example, upon initial reading of the card only the ID photo, signature and account status may be displayed, then if the attendant cannot make a positive identification other data is called up.

Figure 2:
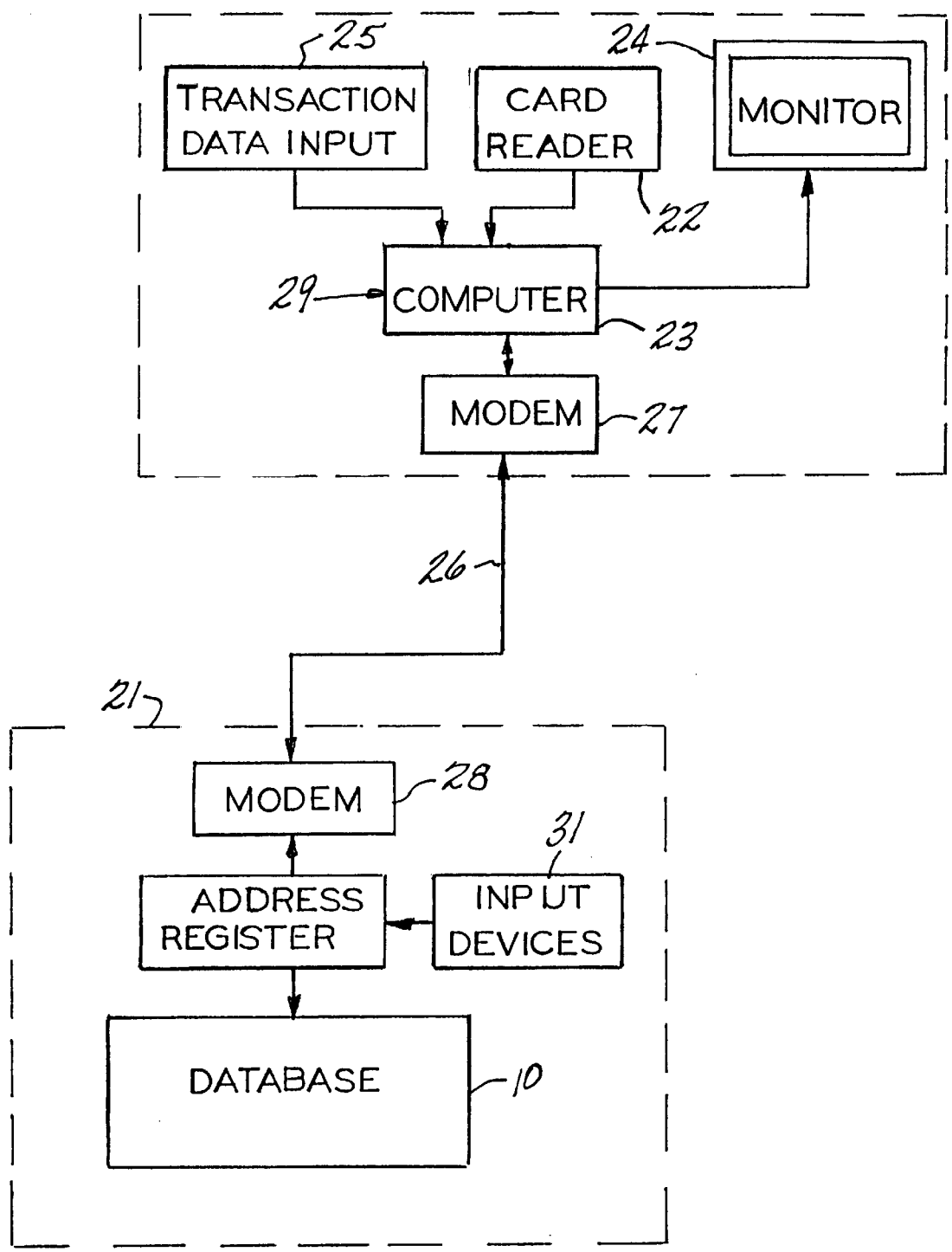
FIG. 2 is a schematic block diagram of a system for practicing the invention.

Reference is now made to FIG. 2, which exemplifies the equipment at a point of transaction 20 and an account database 10 at a remote location 21. The attendant will have available at the point of transaction a card reader 22 coupled to a computer 23 or control for a monitor and a monitor 24. Computer 23 also receives an input of transaction data from a source 25 which is typically an optical bar code reader. Transaction data source 25 may be any type of device, including a keyboard, for identifying the subject of the transaction and/or the amount thereof.

Upon reading the card the card account number or other identifying indicia is addressed in database 10 at remote location 21 via a bi-directional transmission line 26 (usually a dedicated telephone line at the point of transaction) and modems 27 and 28. The account number transmitted from the point of transaction 20 may be applied to an address register 30, which will point to the information of that account. The data in the account, including the ID photo will be called up and displayed on monitor 23. If only part of the account data in the database is initially displayed and the attendant wants more data for identification or inquiry, the attendant may signal the data base using an attendant input 29 to call for additional data on the authorized card holder. The additional data is then forwarded from the database to the point of transaction and viewed by the attendant. This is an optional mode of operation that the credit card issuer may elect to use.

One or more input devices 31 will be provided at the remote location 22 to enable input of new accounts, up-dating of existing accounts, cancellation of accounts or any other desired changes in accounts in the database. Such input devices 29 may include scanners for reproduction of a cardholder's signature, the same as date source 13 of FIG. 1, keyboards, floppy disc drives for entering data previously recorded at another location or any other suitable data input device. Input devices may include a direct input from a digital memory 12 at a transaction point via line 14, as shown in FIG. 1.

A system embodying the invention utilizes existing hardware. No additional equipment is required at a transaction point. The input devices 29 may also include a drive for reading account information, including photo ID's, signatures, and other account data on a record medium, such as a floppy disc, which has been forwarded from a location as shown in FIG. 1.

A feature of the invention is that it may be incorporated in existing systems using the equipment shown in FIG. 1. It does not require the reissuing of new credit cards to existing cardholders.

Figure 3:
FIG. 3 is a front view of a typical credit card account display called up from a central database.

Reference is now made to FIG. 3 which exemplifies the data presented on a monitor when a fictitious person, Larry J. Detize, has his credit card read at a point of transaction. When the card is read, his account number is addressed in database 21 and his photograph, signature and personal data are transmitted to the transaction point for display on a monitor 25. The attendant at the transaction point then compares the photo on the monitor with the appearance of the card presenter. If the comparison is positive, the attendant will complete the transaction. If the attendant is not sure that the card presenter is the Larry J. Detize shown on the monitor he or she may then check the signature on the card against the signature shown on the monitor screen and/or ask the card presenter questions pertaining to the monitor displayed data of Larry J. Detize. If this procedure results in a failure to satisfy the attendant, he or she may then decline the transaction, and follow any procedures specified by the issuer of the credit card and/or the employer.

It may thus be seen that the objects of the invention set forth above as well as those made apparent are efficiently attained. While (a) preferred embodiment(s) of the invention have been set forth for purposes of disclosure, modifications to the disclosed embodiments as well as other embodiments of the invention may occur to those skilled in the art. Accordingly, the appended claims are intended to cover all modifications to the disclosed embodiments of the invention as well as other embodiments thereof which do not depart from the spirit and scope of the invention.

What is claimed is:

1. A method of identification of the presenter of a credit card where the card is presented for a transaction at a point of transaction and where the card includes identifying indicia of an account of an authorized card holder and said indicia is machine read and transmitted to a database, said indicia is used to address an account of an authorized card holder in the database, a video monitor is included at said point of transaction to display information from an addressed account in said database and at least some information in the database account is transmitted to said monitor for display at said point of transaction to authorize or decline said transaction, said method further including the steps of acquiring a digital identification photograph of an authorized card holder and adding said identification photograph to said database of said authorized card holder whereby when the card of an authorized card holder is presented for a transaction at a point of transaction and said card is read, said identification photograph is displayed on the monitor.

2. The method of claim 1 including the further step of acquiring a digital representation of the signature of the authorized card holder and adding said digital representation of the signature to the database account of said authorized card holder whereby when a card is presented for a transaction and read at a point of transaction said monitor will display said identification photograph and said representation of said signature.

3. The method of claim 1 further including the step of entering into the database account of an authorized card holder physical identifying data of the authorized card holder whereby when said card is presented for a transaction and read at a point of transaction the physical data of said authorized card holder is displayed on said monitor together with said identification photograph.

* * * * *